No. 756,499. PATENTED APR. 5, 1904.
L. HUIBREGTSE.
CHEESE CUTTER.
APPLICATION FILED SEPT. 14, 1903.
NO MODEL.
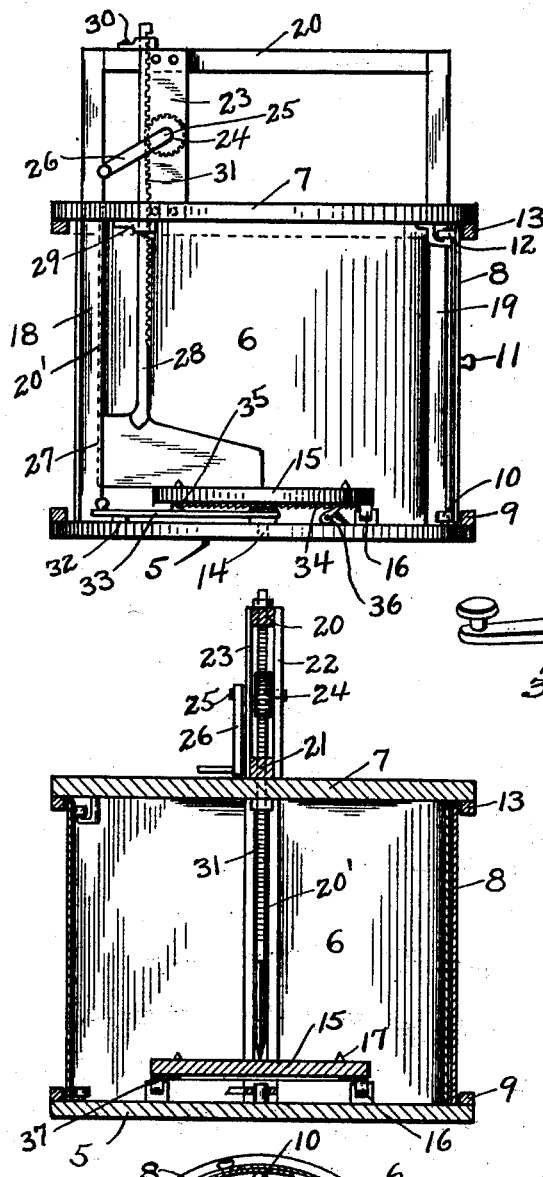
Fig. 1.
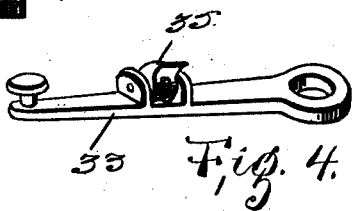
Fig. 4.
Fig. 3
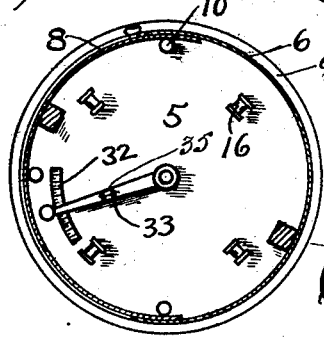
Fig. 2.
Witnesses
Charles Morgan
Fred C. Jones
Inventor
L. HUIBREGTSE
Attorneys No. 756,499. Patented April 5, 1904.

UNITED STATES PATENT OFFICE.

LOW HUIBREGTSE, OF OOSTBURG, WISCONSIN.

CHEESE-CUTTER.

SPECIFICATION forming part of Letters Patent No. 756,499, dated April 5, 1904.

Application filed September 14, 1903. Serial No. 173,127. (No model.)

*To all whom it may concern:*

Be it known that I, LOW HUIBREGTSE, a citizen of the United States, residing at Oostburg, in the county of Sheboygan, State of Wisconsin, have invented certain new and useful Improvements in Cheese-Cutters; and I do hereby declare the following to be a full, clear, and exact description of the invention, such as will enable others skilled in the art to which it appertains to make and use the same.

This invention relates to cheese-cutters; and it has for its object to provide a machine in the nature of a receptacle in which the cheese may be kept and in which the cheese may be cut in approximately the desired quantity.

A further object of the invention is to provide a specific structure which will be cheap and simple of manufacture and which will be efficient in its operation.

In the drawings forming a portion of this specification, and in which like numerals of reference indicate similar parts in the several views, Figure 1 is an elevation of the cutter, the door of the casing or receptacle being open. Fig. 2 is a top plan view of the bottom of the casing with the operating-lever thereon, the wall and door of the casing being in section. Fig. 3 is a vertical section transversely of the plane of the knife. Fig. 4 is a detail view of the lever, showing the spring-pawl.

Referring now to the drawings, the present cutter comprises a cylindrical casing including a base 5 and a wall 6, upon which is secured the top 7. One side of the casing is open and is provided with a curved door 8, which at the open side of the casing runs between the molding 9 and the horizontally-disposed rollers 10, which are mounted upon the base or bottom 5. The door is provided with a knob 11 for sliding it, and when it moves to open position it runs between the wall 6 of the casing and the bead 9, which is exterior thereto. The upper edge of the door runs between rollers 12 on the under face of the top of the casing and the bead 13. The bead or molding 13 extends exterior to the wall of the casing and spaced therefrom, so that when the door is opened it slides therebetween.

Mounted centrally of the casing upon the pivot 14 is a turn-table 15, which is held against tilting by means of the rollers 16, which are mounted in suitable bearings upon the base 5, this turn-table being designed to receive and support the cheese to be cut. To hold the cheese firmly upon the turn-table and prevent any lateral displacement thereof, the upper surface of the turn-table is provided with an annular series of upwardly-directed spikes or pins 17, the series being concentric with the turn-table.

At diametrically opposite points of the casing are uprights 18 and 19, which are continued above the top of the casing, where they are connected by the cross-pieces 20 and 21, to which are attached the spaced plates 22 and 23, between which is disposed a gear-wheel 24, carried by the shaft 25, which is provided with a crank 26 for rotating it.

In the inner face of the upright 18 is a longitudinal groove 20', in which is engaged slidably the heel of a cutter-blade 27, said blade having a stem 28, which extends upwardly through U-shaped guide-plates 29 and 30, which are attached to the upper and lower faces, respectively, of the beams 20 and 21. The stem 28 is provided with rack-teeth 31 on its face adjacent to the gear-wheel 25, and with which rack-teeth said gear-wheel meshes, so that when the crank 26 is operated in one direction the stem will be raised to raise the blade 27, and when the crank is operated in the opposite direction the blade will be forced downwardly.

The blade 27 is disposed so that its free end or point is directly over the center of the turn-table, so that the blade itself lies radially of the table. Thus when the blade is lowered and forced through a cheese upon the turn-table it will make a radial cut through the cheese, and by raising the blade after its first cut and then shifting the turn-table rotatably and again forcing the blade through the cheese a segmental slice will be cut from the cheese.

From the above it will be seen that by shifting the turn-table a certain angular distance after each cut and then operating the cutting-blade a slice of approximately the weight desired may be cut.

To insure the proper rotary movement of the turn-table to correspond approximately to the weight of the slice to be cut, a scale 32 is attached to the base or bottom 5 of the casing, and this scale is traversed by a lever 33, which is pivoted below the turn-table and coaxially therewith. The lever projects beyond the periphery of the turn-table and traverses the scale in its pivotal movement.

To cause the turn-table to rotate with the lever in one direction, a crown-rack 34 is secured to the under side of the turn-table and is engaged by the spring-pawl 35 upon the upper face of the lever 33, the pawl moving freely over the rack-teeth in a rearward direction. Rotation of the turn-table during the rearward movement of the shifting-lever is prevented by the spring-pawl 36, which is mounted upon the bottom of the casing and the free end of which engages the rack-teeth with sufficient friction to hold the turn-table. With this construction it will be seen that after the cheese is put upon the turn-table the blade may be forced through the cheese to make an initial cut and may be then raised from the cheese and that the turn-table may be then shifted to cause the lever 33 to indicate the desired weight on the dial-plate 32 and that the blade may be then forced again through the cheese, so that a slice will be cut which will have a weight indicated by the lever on the dial-plate.

What is claimed is—

A cheese-cutter comprising a casing having uprights at diametrically opposite points thereof, a beam connecting the uprights at their upper ends, a top for the casing secured to the uprights below the beam and having an opening therethrough, an upright mounted upon the top adjacent to the opening and attached at its upper end to the beam, a gear-wheel rotatably mounted upon the last-named upright and having a crank attached thereto, a knife slidably engaged at its rear edge with one of the first-named uprights, a rack-bar connected to the knife and extending upwardly through the opening in the top of the casing and with its rack in engagement with the gear, a turn-table rotatably mounted below the knife and having a depending concentric crown-rack, a lever pivoted beneath and coaxially with the turn-table, a pawl mounted upon the lever below the turn-table for engagement of the rack to rotate the turn-table when the lever is moved in one direction, and means disposed below the turn-table to hold it against movement in the other direction.

In testimony whereof I affix my signature in presence of two witnesses.

LOW HUIBREGTSE.

Witnesses:
HERMAN LUMKUIL,
G. J. T. GROVTENHUIR.